US008639741B2

(12) United States Patent
Gonzalez Plaza et al.

(10) Patent No.: US 8,639,741 B2
(45) Date of Patent: Jan. 28, 2014

(54) METHOD FOR DISTRIBUTING REQUESTS TO SERVER COMPUTERS

(75) Inventors: Alfredo Gonzalez Plaza, Rivas Vaciamadrid (ES); Luis Ramos Robles, Coslada (ES); Fernando Cecilia Torralba, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 300 days.

(21) Appl. No.: 12/676,457

(22) PCT Filed: Sep. 4, 2007

(86) PCT No.: PCT/EP2007/059238
§ 371 (c)(1),
(2), (4) Date: Mar. 4, 2010

(87) PCT Pub. No.: WO2009/030272
PCT Pub. Date: Mar. 12, 2009

(65) Prior Publication Data
US 2010/0211625 A1    Aug. 19, 2010

(51) Int. Cl.
*G06F 15/16* (2006.01)

(52) U.S. Cl.
USPC .............................................. 709/202; 725/93

(58) Field of Classification Search
USPC ............................................ 709/202; 725/93
See application file for complete search history.

(56) References Cited

U.S. PATENT DOCUMENTS 8,037,506 B2 * 10/2011 Cooper et al. ................... 725/93
2008/0155059 A1 * 6/2008 Hardin et al. ................. 709/218

FOREIGN PATENT DOCUMENTS

| WO | WO 99/53415 A | 10/1999 |
| WO | WO 00/19316 A | 4/2000 |

* cited by examiner

*Primary Examiner* — Adnan Mirza

(57) ABSTRACT

In the method of the invention, requests received by a request distributor are distributed to server computers. The request distributor uses distribution information for selecting, as a destination for the requests, a server computer. A first request relating to a delivery of a service is received by the request distributor and sent to one server computer. The server computer then receives the first request. Finally, it is determined whether a further request relating to the delivery of the service is expected to be received by the request distributor, and, if so, distribution information is made available to the request distributor.

45 Claims, 11 Drawing Sheets

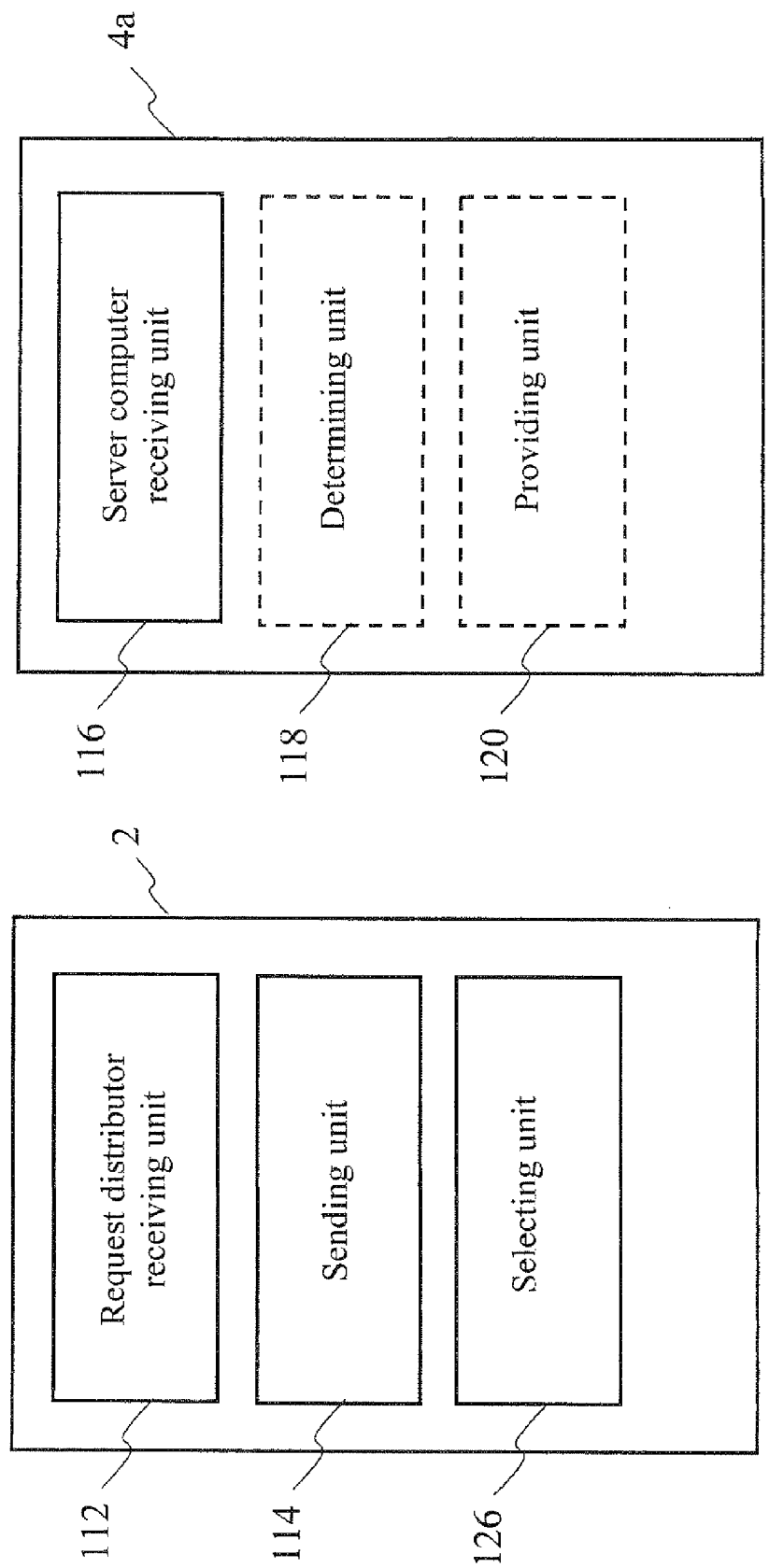

METHOD FOR DISTRIBUTING REQUESTS TO SERVER COMPUTERS

TECHNICAL FIELD

The present invention relates to a method for distributing requests received by a request distributor to server computers. It also relates to a system, a request distributor and a server computer for carrying such a method.

BACKGROUND

Telecommunications networks, such as mobile communications networks, and computer networks, such as the Internet, are widely used for remotely providing services to terminals accessible by users or customers. These terminals are herewith referred to as client terminals while the users or customers accessing the client terminals are herewith referred to as client users. The provision of a service is a technical and economical activity which may for instance result in the ownership of physical goods through a sale.

The provision of a service may for instance be initiated by the transmission of a request for a service, such as a Hypertext Transfer Protocol (HTTP) request through a computer network. The request for a service is transmitted from a client terminal to a computer system configured for handling the request and for carrying steps to provide the service. After reception of the request, a response thereto may be sent by the computer system, which may for instance include a web server, to the client terminal in order to request more information input from the client user or in order to confirm to the client user that a service or a portion of a service has been successfully provided.

The requests and responses exchanged between the client terminals and the computer system constitute data communication traffic travelling on networks, for instance switched data packet networks. The networks may include routers, which are processing units configured for determining the proper path for the requests and responses to travel in the networks, and for forwarding the requests and responses to the next device along this path.

In the context of providing a service through a network infrastructure, performance and reliability constitute two requirements.

The performance of a computer network infrastructure may be viewed as a measure of the quality and responsiveness of the infrastructure for providing a service as seen from client users. The reliability of a computer network infrastructure may be viewed as a measure of how reliable the infrastructure is for providing a service, which may for instance be related to the likelihood that the computer network infrastructure fails to provide the service.

Methods exist to improve the performance and reliability of a computer network infrastructure or system. One method is to use a configuration or architecture wherein a plurality of server computers are provided in the system configured for handling the requests for a service. A server computer is a computer configured with computer instructions for accepting connections to service requests and for optionally sending back responses.

Such a plurality of server computers may be arranged as a cluster of server computers with a particular server computer acting as a request distributor. More generally, a request distributor refers to a computer entity configured for receiving requests from a network and for distributing these requests.

As seen from the client users, the system including the cluster of server computers and the request distributor can be perceived as a single computer carrying out actions to respond to the requests and provide the service. The system includes a plurality of server computers, i.e. the cluster of server computers, but it operates in such a manner that the presence of the cluster is generally not perceived by client users. The operation of the cluster is generally said to be transparent to the client users.

In order to improve the performance and reliability of the system for providing the service, the capacity of a server computer cluster may be increased by increasing the number of server computers in the cluster. Client users substantially see no difference, except the improved performance and reliability, since the client terminals exchange requests and responses only with an access point. The access point may for instance be the request distributor or another entity arranged between the client terminals and the request distributor. A certain degree of transparent scalability is said to be provided when the number of server computers can be increased while the client users substantially see no difference.

Thus, increasing the number of server computers in a cluster, also called server pool or server farm, generally improves reliability and performance. Reliability is improved by providing redundancy in the event of the failure of one or more server computers or in the event that one or more server computers are temporarily shut down for maintenance. Performance is increased by an increase spreading of the requests amongst the server computers and thus the responsiveness of the server computers is increased, because a given amount of requests may be handled by more server computers.

The architecture including the cluster of server computers and the request distributor to receive the requests enables distributed and parallel handling of the service requests.

The request distributor has the function of distributing, or dispatching, the requests to the server computers making up the cluster.

The distribution mechanism for distributing the requests to the server computers and for spreading work between them may be a load-balancing mechanism. It may aim at a uniform use of resources across the available server computers and may for instance be based on a round robin scheduling mechanism where each server computer receives an equal share of the requests in turn. The distribution mechanism may be independent of the capacity or status of the server computers, or may instead depend on the hardware or software characteristics of the server computers or on their status or characteristics at a given moment in time, such as their processing or memory capacity, their response time, or the number of active connections, i.e. the communication link usage.

Static configuration rules to determine the destination server computer may be used by the request distributor to distribute the requests, depending for instance on the content or type of the requests.

In addition, one or more server computers may be specialized for handling certain tasks and the static configuration rules may take this functional specialization into account.

The server computers have the function of handling the requests transmitted from the request distributor. The handling of the requests enables to provide the service.

The completion of most services involves a plurality of steps to be carried out according to an execution flow. Therefore, context information pertaining to each one of the initiated service delivery processes is needed by the server computer for handling requests. The state of the interaction with one client user, i.e. the state in the service execution flow, needs to be retained and available when and where necessary. A service delivery process is a process of providing a given service to a given client terminal. In addition to retaining the state of the service delivery process, the context information may include user preferences associated with the handling of the service.

In the context of providing a service through a computer network infrastructure, methods exist to retain context information or, in other words, to provide persistence.

A first solution to retain context information is to send all requests relating to a same service delivery process to a given server computer which retains context information for handling these requests. In this solution, the request distributor may for instance send all requests coming from the same source, e.g. from a given Internet Protocol (IP) address or a given network access server (NAS), to one server computer. The information about the state of the service delivery process is stored locally in the server computer. That is, upon processing a request, the server computer keeps necessary information about the service delivery process. This solution binds a server computer to a client terminal.

This solution requires that the request distributor is able to recognize the requests associated with a given service delivery process. However, this is not always possible. In addition, this solution runs counter the primary advantages of load balancing. This is especially true if, from a given source such as a given Internet Protocol (IP) address of a network access server (NAS), many requests relating to different deliveries of service and coming from different client users are received.

A second solution is to allow all computer servers to access a shared database or shared resources wherein the context information about all executing service delivery processes is stored.

This solution introduces the complexity of adding a shared database and affects the overall system efficiency by requiring extra steps to be implemented to store (write) and retrieve (read) context information from the shared database.

As a third solution, small tokens such as cookies, which are sent in every client request and include the indication of the state of the service delivery process, may be used. In other words, the client terminal is provided with context information, and upon sending the next request, the client includes the context information. The server computer can therefore retrieve the context information from the request itself.

The third solution requires additional information, i.e. the context information, to be transferred on the network to the client terminal and back to the request distributor and the server computer. This may cause an additional load on the network. The solution also involves transferring context information to the client terminal, a practice which involves security issues as sensitive information pertaining to the system internal operation may then be sent.

The three above-described solutions have each specific problems and generally lack flexibility. It is therefore desirable to provide an alternative method for distributing requests which solves or partially solve the above-mentioned problems.

SUMMARY

Such a method is provided by claim 1. Advantageous embodiments are described in the dependent claims.

In the method, requests received by a request distributor are distributed to at least two server computers. The request distributor is configured to use distribution information for selecting, as a destination for each of at least some of the requests, one of the at least two server computers, depending on at least one attribute associated with said each request. The method includes a request distributor receiving procedure, a sending procedure, a server computer receiving procedure, a determining procedure and a providing procedure. The request distributor receiving procedure is a procedure for receiving, by the request distributor, a first request from a network, wherein the first request relates to a delivery of a service. The sending procedure is a procedure for sending, by the request distributor, the first request to one of the at least two server computers. The server computer receiving procedure is a procedure for receiving, by the one of the at least two server computers, the first request sent by the request distributor. The determining procedure is a procedure for determining whether a further request relating to the delivery of the service is expected to be received by the request distributor. Finally, the providing procedure is a procedure for making available distribution information to the request distributor if, in the determining procedure, a further request relating to the delivery of the service is determined to be expected to be received by the request distributor.

The method enables a dynamic determination by the request distributor of the most appropriate server computer to handle a further request relating to a given delivery of a service. The determination of the destination of requests is based on distribution information which is made available to the request distributor if a further request relating to a given delivery of a service is expected to be received. The actual state in a given service execution flow may therefore be taken into account by the server computers to guide the request distributor in its distribution task.

The distribution of requests may therefore be tailored by information made available to the request distributor on a delivery of service per delivery of service basis. In other words, for each individual initiated delivery of a service, specific distribution information may be made available to the request distributor, thus providing increased operational flexibility.

In addition, server computers specialized in the cluster for carrying out certain tasks may be used to handle certain requests depending on a state reached in a service execution flow, but also depending on any parameter specific to a particular execution of a service execution flow, i.e. depending on a particular individual delivery of a service.

In other words, at a given point during the delivery of a service, distribution information may be provided to the request distributor by a server computer, which has the knowledge about the logic of the service, the service execution flow, the nature of the service and the particularities of a given delivery of a service. The server computer can therefore make tailored distribution information available to the request distributor.

The selection of the most appropriate server computer or the most appropriate set of server computers for handling an expected further request, and the setting of the most appropriate distribution rules or routing parameters in the request distributor are therefore improved.

In addition, all requests relating to an individual delivery of a service are not required to be sent to the same server computer. Neither does the method require the server computer to maintain context information locally. Instead, context information may be maintained locally, may be stored in a shared database, or may be passed from one server computer to another server computer in charge of handling a next step in a service execution flow. This provides more flexibility in the specialization of the server computers and in the distribution of the requests to the server computers according to dynamically configured distribution rules in the request distributor.

In one embodiment of the method according to the invention, each initial request relating to a service is sent by the request distributor to one particular server computer, or to one of a set of particular server computers. This particular server computer is, or this set of particular server computers are, specialized in handling initial requests and in performing required authentication.

In this embodiment, after the reception and handling of the initial request by a particular server computer and after the subsequent initial authentication, a certain number of exchanges are performed with that particular server computer. Once a valid user identity is determined, the server computer makes distribution information available to the request distributor to instruct said request distributor to redirect an expected further request to another given specialized server computer. This other specialized server computer may be specialized in handling some further steps in the service delivery process.

In another embodiment, an initial Hypertext Transfer Protocol (HTTP) GET request is received by the request distributor. A Hypertext Transfer Protocol (HTTP) GET request is a request from a view or representation of a specified resource such as a Hypertext Markup Language (HTML) page. The initial request may be a request of a form. The request distributor may then send the request to a default server computer specialized in returning to client terminals Hypertext Markup Language (HTML) pages representing forms.

The requested form, to be filled by the client user, is then sent as a response to the client terminal through the request distributor. At the same time, by adding a parameter to the response, the server computer informs the request distributor of a distribution rule for handling further request relating to the delivery of the service. The further request, which is expected to be received after a Hypertext Transfer Protocol (HTTP) GET request of a form, may be a Hypertext Transfer Protocol (HTTP) POST of the form. A Hypertext Transfer Protocol (HTTP) POST request submits data to be processed by a server computer, e.g. the data associated with the filled form. The specific server computer may be specialized in handling Hypertext Transfer Protocol (HTTP) POST request, including data associated with a filled form.

In one embodiment, the method is such that the determining procedure further includes determining that a response to the first request is to be sent by the one of the at least two server computers and that the further request relating to said service is expected to be received by the request distributor after the response is sent.

This embodiment enables sending the distribution information from the server computer to the request distributor with the response to the first request, so that the request distributor receives the appropriate distribution information when transmitting the response from the server computer back to the client terminal and before receiving the expected further request from the client terminal.

In one embodiment, the method is such that the distribution information identifies that the preferred or assigned destination for the further request is one of the at least two server computers.

This has the advantage of providing a simple distribution rule for use by the request distributor and an efficient manner for assigning expected further request to specialized server computers.

In one embodiment, the method is such that the determining procedure is performed by the one of the at least two server computers.

This has the advantage that the server computer in charge of handling a first request may determine, based on the first request, i.e. based for instance on its content and nature, and further based on the knowledge the server computer has of the service execution flow, whether a further request is expected or not. The request distributor may thus be provided with relevant, fine-grained distribution rules. In addition, no traffic is generated and no processing work need be carried out to dynamically configure the request distributor in the event that no further request is expected.

In one embodiment, the method is such that the providing procedure is performed by the one of the at least two server computers.

This has the advantage that the server computer in charge of handling a first request may determine, based on the first request, i.e. based for instance on its content and nature, and further based on the knowledge the server computer has of the service execution flow, what distribution information needs to be made available to the request distributor. The request distributor may thus be provided with relevant, fine-grained distribution rules directly transmitted from the server computer.

The invention further consists in a method, carried out by a server computer, of making distribution information available to a request distributor. In this method, the request distributor is configured to receive requests from a network, to distribute each one of the requests to one of the server computer and at least one another server computer, and to use the distribution information for selecting, as a destination for each of at least some of the requests, one of the server computer and the at least one another server computer, depending on at least one attribute associated with said each request. The method includes a determining procedure for determining, by the server computer, based on at least one of a first request received by the server computer from the request distributor and associated with a delivery of a service, and the service, whether a further request relating to the delivery of the service is expected to be received by the request distributor. The method further includes a providing procedure for making available, by the server computer, the distribution information to the request distributor if, in the determining procedure, a further request relating to the delivery of the service is determined to be expected to be received by the request distributor.

The invention further consists in a method, carried out by a request distributor, of distributing requests to at least two server computers. In this method, the request distributor is configured to receive requests from a network and to distribute each one of the requests to one of at least two server computers, and at least one of the at least two server computers is configured to make available distribution information to the request distributor. The method includes a receiving procedure for receiving, by the request distributor, a first request from the network, wherein the first request relates to a delivery of a service. The method further includes a sending procedure for sending, by the request distributor, the first request to one of the at least two server computers. The receiving procedure further includes receiving, by the request distributor, a further request relating to the delivery of the service. The method further includes a selecting procedure for selecting, by the request distributor, as a destination for the further request, one of the at least two server computers, by using distribution information made available by one of the at least two server computers to the request distributor and depending on at least one attribute associated with the further request. Finally, the sending procedure further includes sending, by the request distributor, the further request to the server computer selected in the selecting procedure.

The invention further consists in a system including a request distributor and at least two server computers. The system is configured for distributing request received by the request distributor to the at least two server computers. Said request distributor is configured to use distribution information for selecting, as a destination for each of at least some of the requests, one of the at least two server computers, depending on at least one attribute associated with said each request. The system further includes a request distributor receiving unit, a sending unit, a server computer receiving unit, a determining unit and a providing unit. The request distributor receiving unit is configured for receiving, by the request distributor, a first request from a network, wherein the first request relates to a delivery of a service. The sending unit is configured for sending, by the request distributor, the first request to one of the at least two server computers. The server computer receiving unit configured for receiving, by the one of the at least two server computers, the first request sent by the request distributor. The determining unit is configured for determining whether a further request relating to the delivery of the service is expected to be received by the request distributor. Finally, the providing unit is configured for making available distribution information to the request distributor if, in the determining unit, a further request relating to the delivery of the service is determined to be expected to be received by the request distributor.

The invention further consists in a server computer configured for making distribution information available to a request distributor. Said request distributor is configured to receive requests from a network, to distribute each one of the requests to one of the server computer and at least one another server computer, and to use the distribution information for selecting, as a destination for each of at least some of the requests, one of the server computer and the at least one another server computer, depending on at least one attribute associated with said each request. The server computer includes a determining unit configured for determining, based on at least one of a first request received by the server computer from the request distributor and associated with a delivery of a service, and
the service, whether a further request relating to the delivery of the service is expected to be received by the request distributor. Furthermore, the server computer includes a providing unit configured for making available the distribution information to the request distributor if, in the determining unit, a further request relating to the delivery of the service is determined to be expected to be received by the request distributor.

The invention further consists in a request distributor configured for distributing requests to at least two server computers. Said request distributor is configured to receive requests from a network and to distribute each one of the requests to one of at least two server computers, and
at least one of the at least two server computers is configured to make available distribution information to the request distributor. The request distributor includes a receiving unit configured for receiving a first request from the network, wherein the first request relates to a delivery of a service. The request distributor further includes a sending unit configured for sending the first request to one of the at least two server computers. The receiving unit is further configured for receiving a further request relating to the delivery of the service. The request distributor further includes a selecting unit configured for selecting as a destination for the further request, one of the at least two server computers, by using distribution information made available by one of the at least two server computers to the request distributor and depending on at least one attribute associated with the further request. Finally, the sending unit is further configured for sending, by the request distributor, the further request to the server computer selected by the selecting unit.

BRIEF DESCRIPTION OF THE DRAWINGS

Embodiments of the present invention shall now be described, in conjunction with the appended figures, in which:

FIG. 11 schematically illustrates a request distributor according to an embodiment of the invention;

FIG. 12 schematically illustrates a server computer according to an embodiment of the invention;

DETAILED DESCRIPTION

The present invention shall now be described in conjunction with specific embodiments. It may be noted that these specific embodiments serve to provide the skilled person with a better understanding, but are not intended to in any way restrict the scope of the invention, which is defined by the appended claims.

Figure 1:
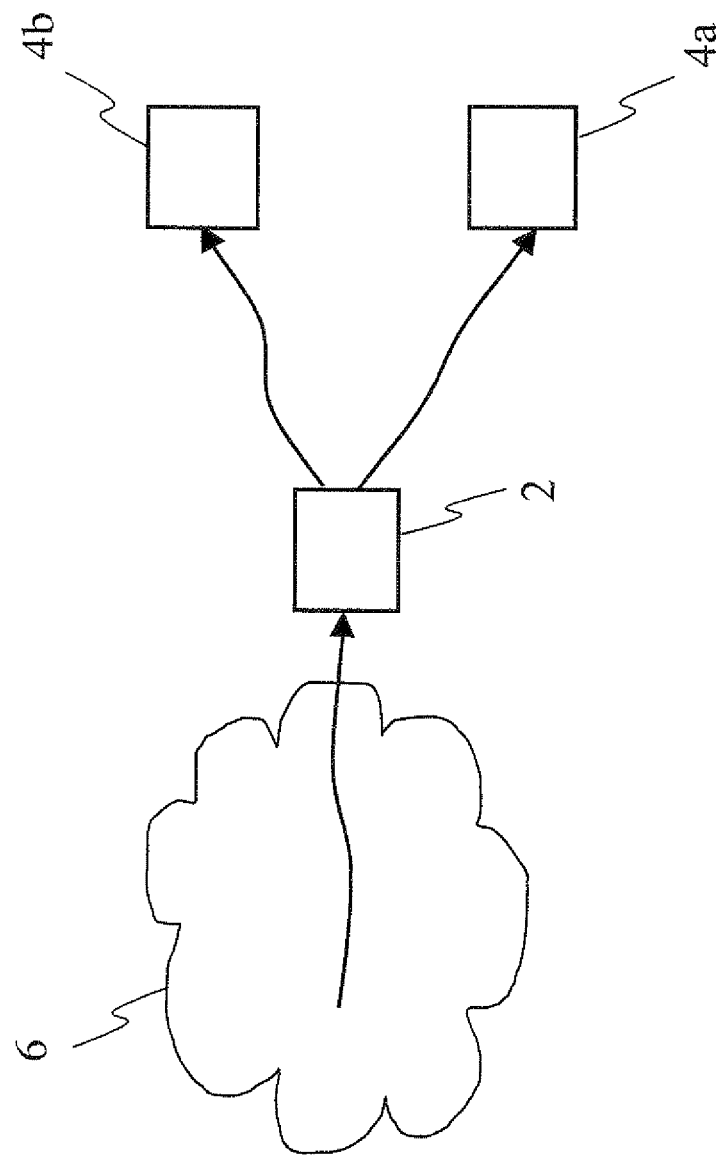
FIG. 1 schematically illustrates an embodiment of a network configuration wherein a method according to the invention may be carried out.

FIG. 1 schematically represents an embodiment of an architecture wherein a method of the invention may be performed.

In this architecture, a request distributor 2 is configured to receive requests for a service from a network 6. The arrow reaching the request distributor 2 and coming from the network 6 illustrates the transmission of requests and their reception by a request distributor 2. The requests originate directly or indirectly from one or more client terminals (not illustrated on FIG. 1). The client terminals are able to be connected to at least one network and able to send requests to the request distributor 2. The request distributor 2 is connected to the network 6 and able to receive requests transmitted from the network 6. The client terminals may be connected directly to the network 6. Alternatively the client terminals may be connected to another network (not illustrated) which is directly, or indirectly through yet other networks (not illustrated), connected to the network 6.

Intermediary network nodes may be added to the architecture, such as a firewall in front of the request distributor 2 to act as a filter to prevent malicious requests from reaching the request distributor 2 or to detect any such malicious requests.

The request distributor 2 is configured to distribute the received requests to one of the server computers 4a, 4b. Only two server computers 4a, 4b are represented in FIG. 1, but more than two server computers 4a, 4b may be provided. Their number is not limited.

A request distributor 2 is a computer entity configured for receiving requests from a network 6 and for distributing the requests. A server computer 4a, 4b is a computer configured with instructions for accepting connections to service requests and for optionally sending back responses. Distributing requests to server computers 4a, 4b means sending each one of the requests to at least one server computer 4a, 4b. In one embodiment, the distribution of requests is implemented by sending each one of the requests to only one server computers 4a, 4b. In another embodiment, some of the requests or all requests are sent to more than one server computers 4a, 4b.

A delivery of a service is one or more steps with the intention to obtain or deliver a service. The provision or delivery of a service is a technical and economical activity which may for instance result in the ownership of physical goods through a sale or in the change in the properties of an asset. A service may be provided according to a service execution flow. A same client terminal may initiate a plurality of deliveries of a service. Examples of services include the online process of booking train tickets or buying a book.

The server computers 4a, 4b may be equal in functionality or not. If the server computers 4a, 4b are not equal in functionality, some of them are said to be specialized server computers. For instance, a group of specialized servers may be dedicated to a particular task or set of tasks, while being provided for instance with a particular infrastructure, rights, database accesses, or adapted security software or hardware configurations. Specializing server computers 4a, 4b may be advantageous to concentrate required software or hardware on certain server computers and to relieve other server computers from having such specialized software or hardware configurations or equipments. Particular policies for handling the requests may also be implemented on some server computers depending on which type of requests these server computers are configured to handle.

In other words, the server computers 4a, 4b may either be heterogeneous or homogeneous with respect to their internal architecture, capacity, functionality, etc.

The server computers 4a, 4b may or may not be tightly coupled, may or may not trust each other, may or may not be able to directly communicate with each other, and may or may not be geographically dispersed. In one embodiment, the server computers 4a, 4b of the cluster are tightly coupled, trust each other, are able to communicate with each other and are geographically located close to each other.

In one embodiment, the server computers 4a, 4b are connected to the request distributor 2 through a local area network (LAN) or a storage area network (SAN) so as to be able to efficiently receive requests from the request distributor 2, and to efficiently make available distribution information to a request distributor 2.

In one embodiment, the request distributor 2 has an Internet Protocol (IP) address and Internet Protocol (IP) port. The invention is however not limited to a particular communication protocol.

Figure 2:
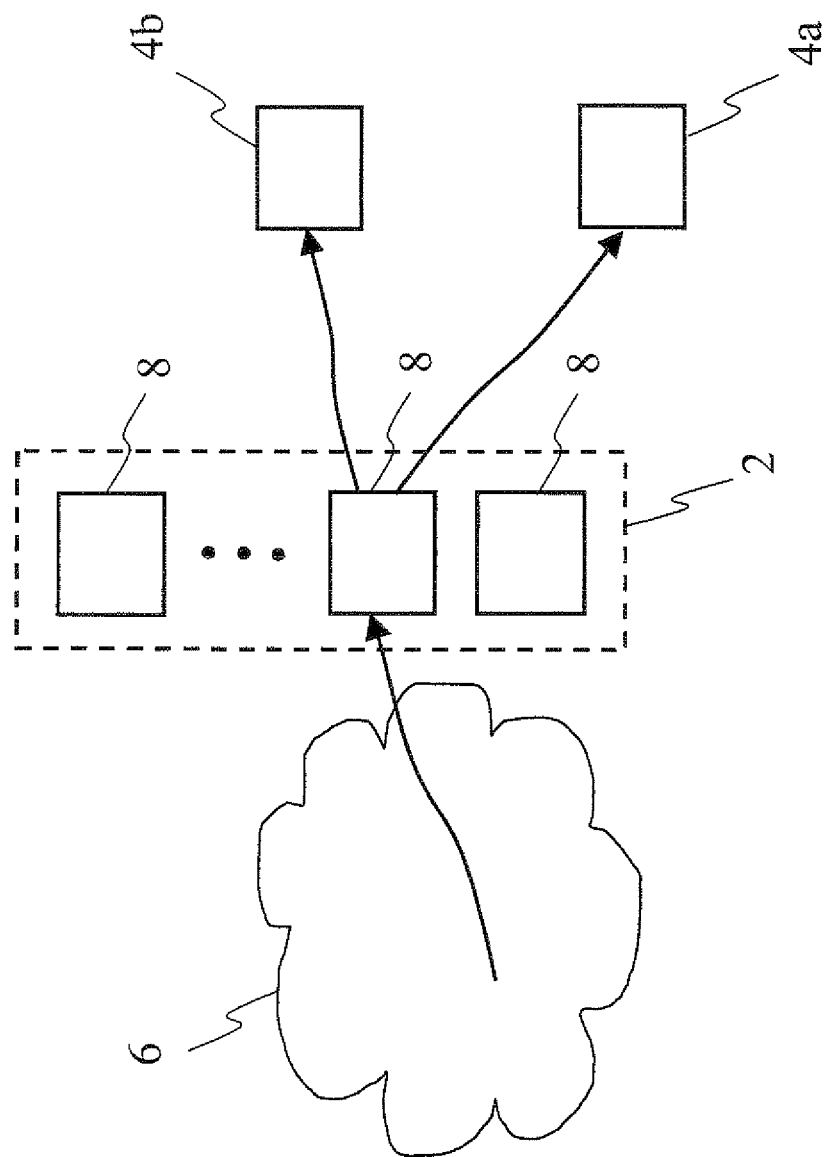
FIG. 2 schematically illustrates an embodiment of a network configuration wherein a method according to the invention may be carried out and wherein the request distributor includes a plurality of nodes.

FIG. 2 schematically illustrates a configuration wherein the request distributor 2 is made up of a plurality of network nodes 8, which may be at the same location or geographically dispersed. The network nodes 8 efficiently provide a service to client users which may located in different locations, since a network node 8 of the request distributor 2 may be located in their area.

In the embodiment illustrated in FIG. 2, the providing procedure 20 may involve making available distribution information to all the network nodes 8 making up the request distributor 2.

Alternatively, the providing procedure 20 may involve making available distribution information only to one or some of the network nodes 8. Simplification of the request distributor 2 internal structure may be obtained by only making available the distribution information to one or some of its network nodes 8.

If, after a first request relating to a delivery of a service, a further request relating to the delivery of the service is received by a network node 8 of the request distributor 2 and this network node 8 has access to the distribution information, the request distributor 2, via the operation of one of its network node 8, may use this distribution information to select a destination server computer 4a, 4b. This provides fine-grained and versatile distribution.

Otherwise, in the event that a further request relating the delivery of the service is received by a network node 8 of the request distributor 2 and this network node 8 has no access to the distribution information made available to the request distributor 2 for distributing the request, the request distributor 2, via the operation of one of its network node 8, may select a destination server computer 4a, 4b according to a default distribution rule. For instance, in that case, the request distributor 2 may send the request to a default server computer 4a, 4b and a mechanism may be provided in the default server computer 4a, 4b for recovering the context information associated with the delivery of the service associated with the received request. This provides simplification on the request distributor side.

Alternatively, the request distributor 2 may include one network node only.

Figure 3:
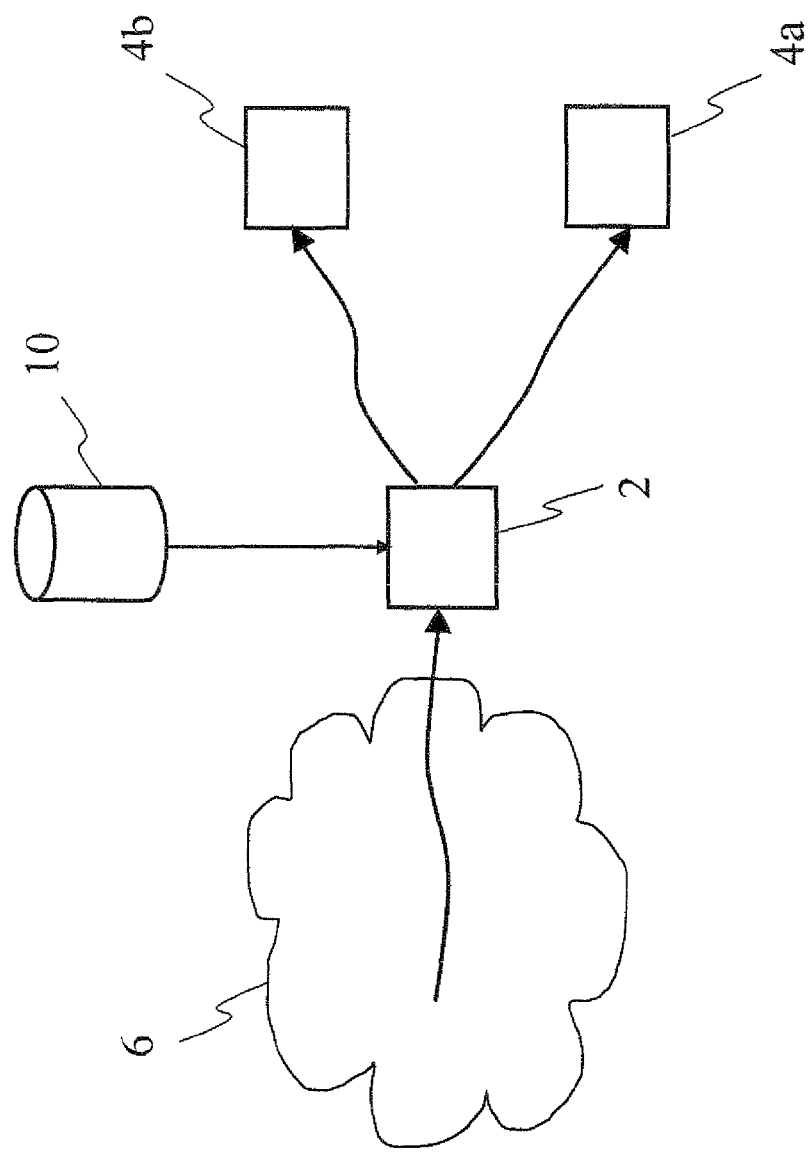
FIG. 3 schematically illustrates an embodiment of a network configuration wherein a method according to the invention may be carried out and wherein a storing means for storing the distribution information is illustrated.

FIG. 3 schematically illustrates a configuration according to one embodiment of the invention, wherein a storage means 10, for instance a database, is accessible to the request distributor 2. All or a part of the distribution information made available in the providing procedure 10 to the request distributor 2 may be made available in this storage means 10 for use by the request distributor 2.

In one embodiment, the storage means 10 is a Lightweight Directory Access Protocol (LDAP) compliant directory. The storage means 10 may also for instance be a text file or a database.

Figure 4:
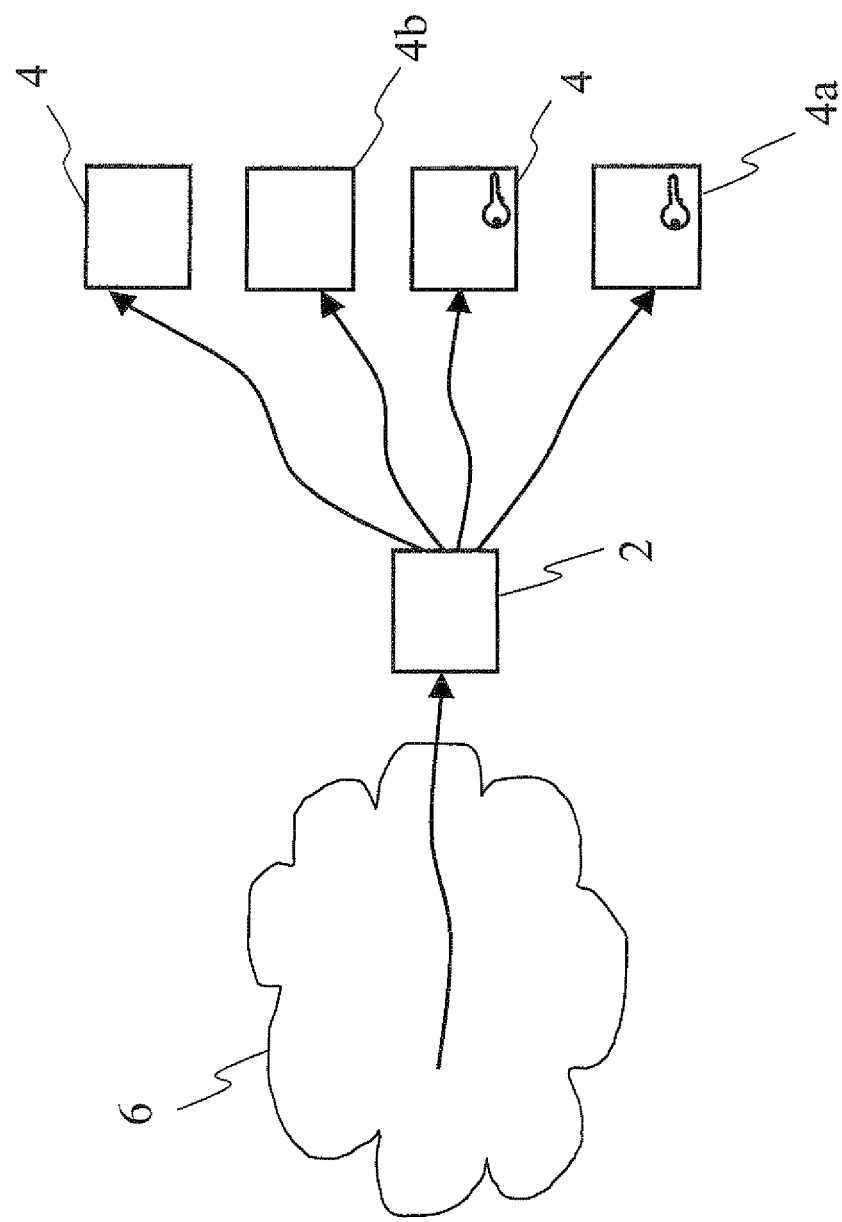
FIG. 4 schematically illustrates an embodiment of a network configuration wherein a method according to the invention may be carried out and wherein the server computers are functionally specialized.

FIG. 4 schematically illustrates a configuration according to one embodiment of the invention, wherein some of or all the server computers 4a, 4b, 4 are functionally specialized. For instance, the two server computers 4a, 4 represented on the right bottom of FIG. 4 with a small illustrative key label may be specialized in performing authentication procedures.

These server computers 4a, 4 may be in charge of handling initial service requests for authenticating a client user during a delivery of a service.

The distribution information made available to the request distributor 2 may take advantage of this server computer specialization. A server computer 4a, 4b, 4, having received a first request relating to a delivery of a service, may determine, depending on the particulars of the individual delivery of the service, that a further request is to be sent to another specialized server computer having for instance a particular hardware, such as a particularly large storage capacity, a particularly secure storage, a particularly powerful processing unit, particular processing means, a particular software configuration, such as available cryptographic functions, or being in a particular virtual local area network (VLAN) for traffic separation reasons.

Figure 5:
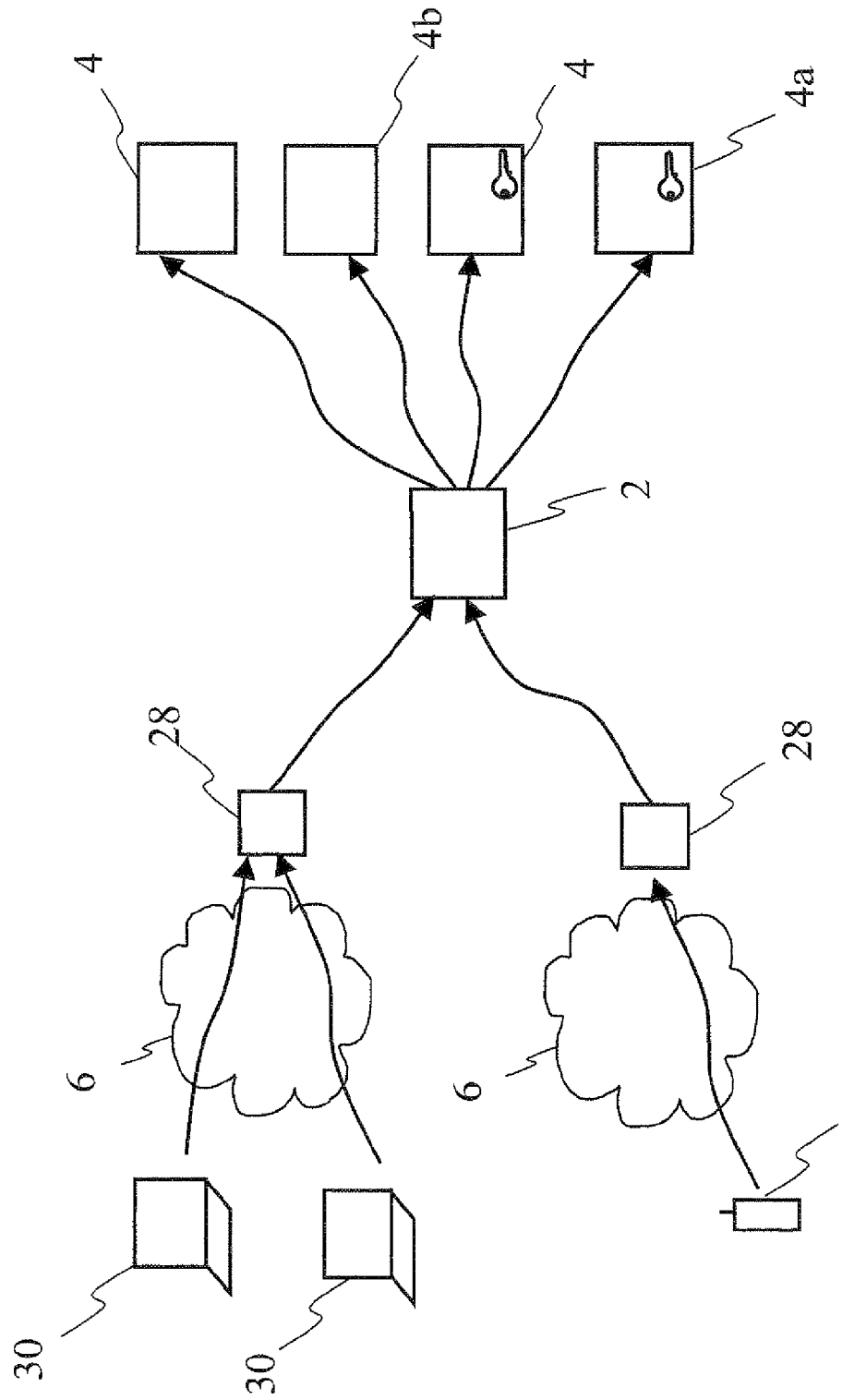
FIG. 5 schematically illustrates an embodiment of a network configuration wherein a method according to the invention may be carried out, wherein the server computers are functionally specialized and wherein the request distributor receives requests from wireless local area network (WLAN) access points.

FIG. 5 schematically illustrates a configuration according to one embodiment of the invention, wherein different client terminals 30 send requests to the request distributor 2 through different networks 6 and different access point 28. One access point may be a wireless local area network (WLAN) access point 28 providing access from a wireless local area network (WLAN) 6 to which terminals 30, for instance computers or laptops, are connected. Another access point may be a base station 28 providing access from a radio access network 6 to which terminals 30, for instance mobile communication terminals, are connected.

Figure 6:
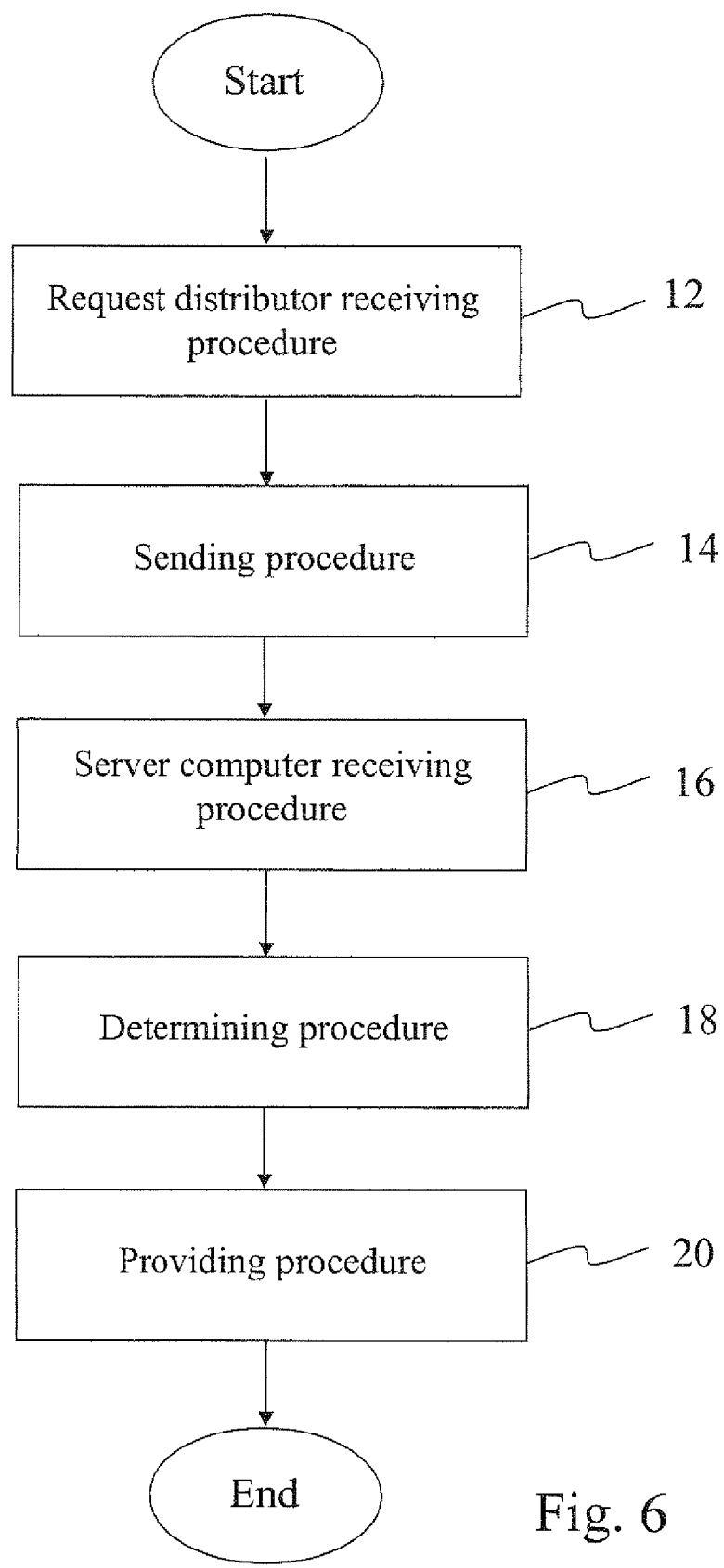
FIG. 6 is a flow chart of an embodiment of a method according to the invention.

FIG. 6 represents a flow chart of an embodiment of a method according to the invention. A series of procedures are provided and are intended to be carried out consecutively.

First, a request distributor receiving procedure 12 provides steps and instructions to be carried out by a request distributor 2 for receiving a request from a client terminal 30 through a network 6. This may be a first request relating to a delivery of a service or a further request relating to the delivery of the service.

Then, a sending procedure 14 is provided for, after reception of a request, sending the request to a server computer 4a, 4b, 4.

A server computer receiving procedure 16 is then provided for receiving, by the server computer 4a, 4b, 4, the request sent by the request distributor 2.

The server computer 4a, 4b, 4 determines, according to a determining procedure 18, whether a further request relating to the same delivery of the service is expected. The determining procedure 18 may for instance be based on at least one of the first request associated with a delivery of a service, the service, the type of the service, the nature of the service, the characteristics of the service, the properties of the service, and the reached stage in the delivery of the service.

If a further request relating to the delivery of the service is determined to be expected to be received, then distribution information is made available to the request distributor 2, according to a providing procedure 20. The request distributor 2 is configured to use the distribution information to later select the destination server computer 4a, 4b, 4 of a request depending on at least one attribute associated with the request. The distribution information may be parameters for routing policies configured in the request distributor 2 or the distribution information may be the routing policies themselves.

In one embodiment of a providing procedure 20, a server computer 4a, 4b, 4 having received a request from a client terminal 30 and having determined that a response is to be sent to the client terminal 30, adds to the response to the request a specific attribute, parameter, or heading, etc that has to be transmitted only between the server computer 4a, 4b, 4 and the request distributor 2. The response is sent by the server computer 4a, 4b, 4 to the request distributor 2.

The request distributor 2, having received the response to be handled and forwarded to the client terminal 30, may then optionally remove the specific attribute, parameter, heading, etc before sending the service response to the client terminal 30. Removing, by the request distributor 2, the specific attribute, parameter, or heading, etc before forwarding the response to the client terminal 30 improves the security, privacy and transparency of the method, in that the client terminal 30 is not provided with information about the internal structure and operation of the system.

In another embodiment of a providing procedure 20, a server computer 4a, 4b, 4 adds specific information to a standard attribute, parameter, heading, etc which content has a special meaning to the request distributor 2. No modification is therefore required to an existing communication protocol for communicating between a server computer 4a, 4b, 4 and a request distributor 2. The request distributor 2 may then optionally remove the added information before sending the service response to the client terminal 30, thus increasing privacy, security and transparency.

In yet another embodiment of a providing procedure 20, a server computer 4a, 4b, 4 may re-use a standard attribute with its standard information in such a manner that the request distributor 2 is able to interpret the content in a specific way. The client terminal 30 may be aware of the attribute existence and its content but not of how the attribute is interpreted by the request distributor 30, thus ensuring a certain degree of privacy, security, and transparency.

In a further embodiment of a providing procedure 20, distribution information is sent using a different and specific interface between the server computer 4a, 4b, 4 and the request distributor 2. The interface may be based for instance on the Lightweight Directory Access Protocol (LDAP), or the Common Open Policy Service (COPS) Protocol, a part of the Internet protocol suite as defined by the Internet Engineering Task Force (IETF) Request for Comments RFC 2748.

In one embodiment of a method of the invention, one of the determining procedure 18 and the providing procedure 20, or both, are carried out by another physical entity than a server computer 4a, 4b, 4.

In one embodiment, the sending procedure 14 is also used to send, by the request distributor 2, a further request to a selected destination server computer 4a, 4b, 4, once an expected further request is received by the request distributor 2 and once, according to a selecting procedure, the request distributor 2 has selected a destination server computer 4a, 4b, 4 by using distribution information made available to the request distributor 2 and depending on at least one attributed associated with the further request.

Figure 7:
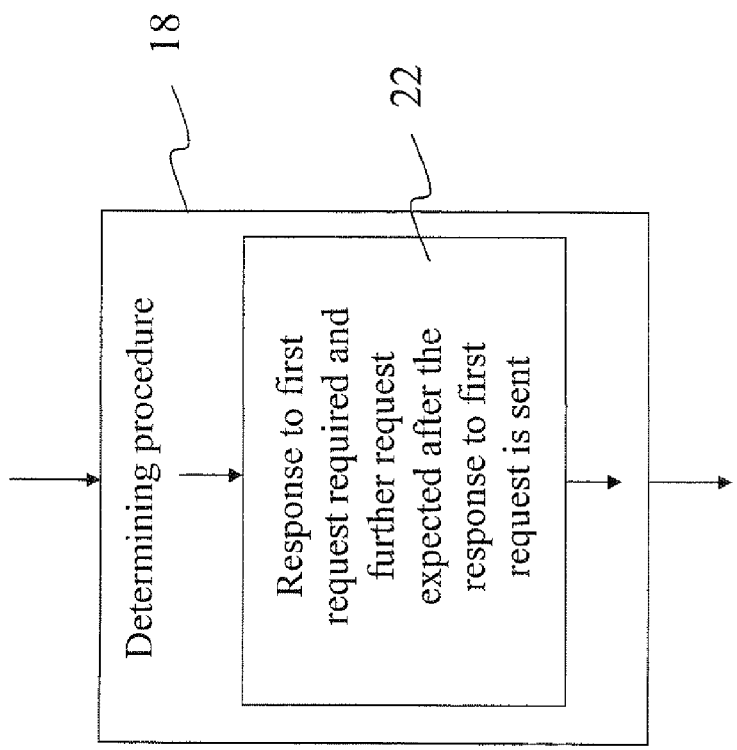
FIG. 7 is a flow chart of an embodiment of the determining procedure of a method according to the invention.

FIG. 7 represents a flowchart of an embodiment of a determining procedure 18 of a method according to the invention, wherein it is determined 22, for instance by the server computer 4a, 4b, 4, not only that a further request relating to the delivery of the service is expected to be received by the request distributor 2 but also that a response is to be sent first to the client terminal 30 before the further request can be expected to be received by the request distributor 2.

Figure 8:
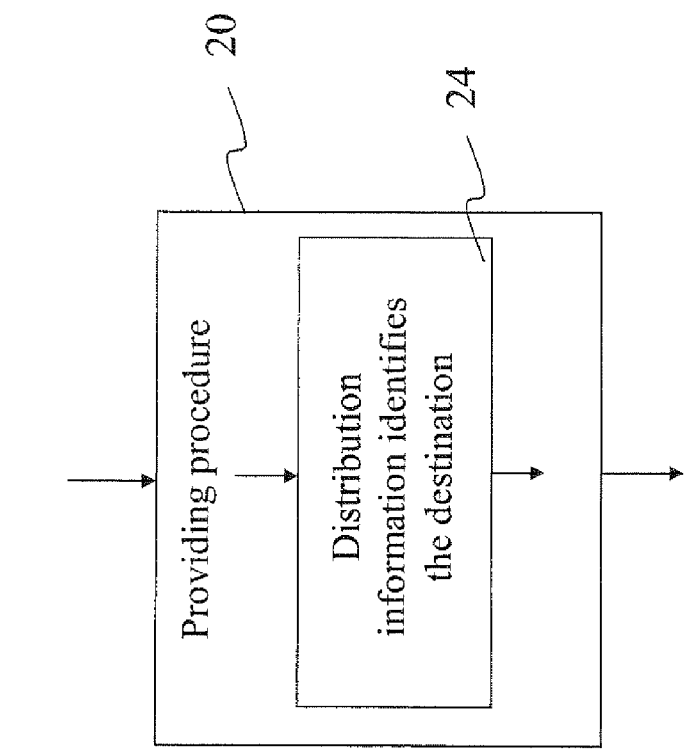
FIG. 8 is a flow chart of an embodiment of the providing procedure of a method according to the invention.

FIG. 8 represents a flowchart of an embodiment of a providing procedure 20 of a method according to the invention, wherein distribution information is made available to the request distributor 2, for instance by the server computer 4a, 4b, 4, and wherein the distribution information identifies a destination server computer 4a, 4b, 4 for the expected further request relating to the delivery of the service. The identified destination server computer 4a, 4b, 4 may be the same as the server computer 4a, 4b, 4 to which the first request was sent or may be another one. In the latter case, context information may be passed from the server computer 4a, 4b, 4 to which the first request was sent to the identified destination computer server 4a, 4b, 4 for proper handling of the service. Reference 24 in FIG. 8 refers to the creation of the distribution information for identifying the destination server computer 4a, 4b, 4.

Figure 9:
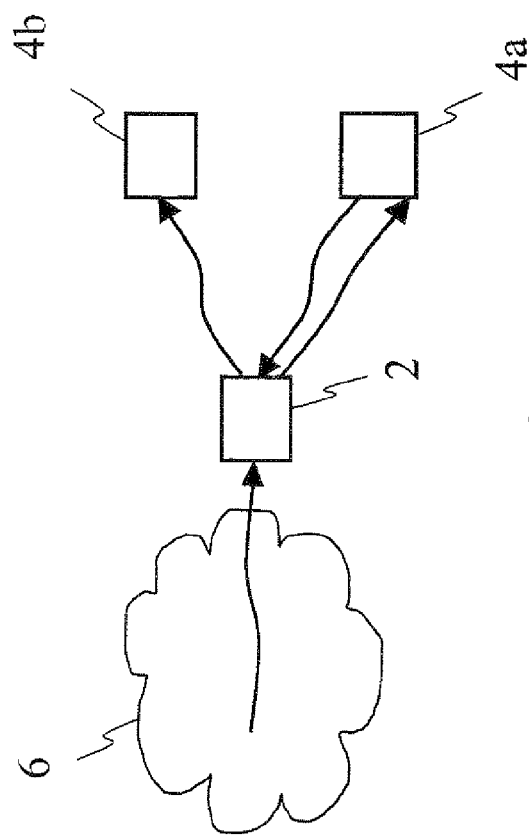

FIG. 9 schematically illustrates a configuration according to one embodiment of the invention, which is similar to the configuration illustrated in FIG. 1 except that a server computer 4a makes available, in the providing procedure 20, the distribution information by directly providing it to the request distributor 2. This providing step is illustrated by the arrow going from the server computer 4a to the request distributor 2.

Figure 10:
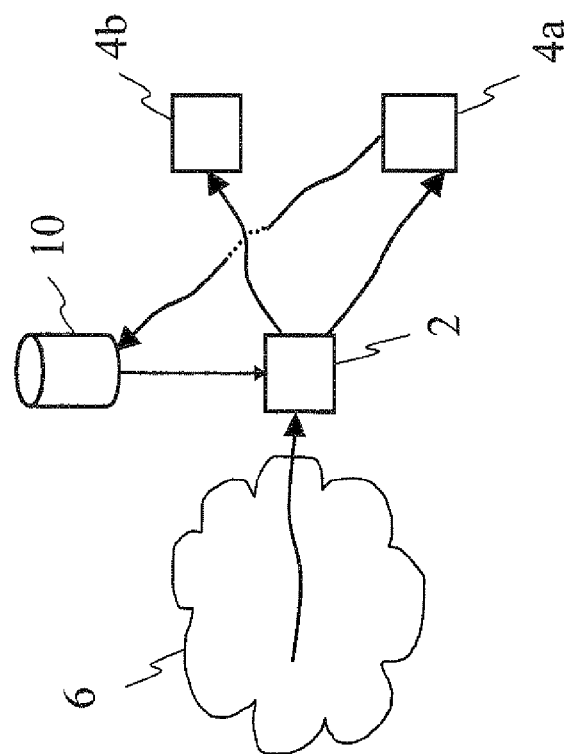
FIGS. 9 and 10 schematically illustrate embodiments of network configurations wherein a method according to the invention may be carried out and wherein, respectively, distribution information is provided directly to the request distributor and distribution information is made available to a storage means accessible from the request distributor.

FIG. 10 schematically illustrates a configuration according to one embodiment of the invention, which is similar to the configuration of FIG. 1 except that a server computer 4a makes available, in the providing procedure 20, the distribution information by storing it in a storage means 10 accessible by the request distributor 2. This providing step is illustrated by the arrow going from the server computer 4a to the storage means 10.

FIG. 11 schematically represents a request distributor 2 according to one embodiment of the invention.

The request distributor 2 includes a request distributor receiving unit 112, or more generally request distributor receiving means, configured for performing the request distributor receiving procedure 12 described with reference to FIG. 6.

The request distributor 2 also includes a sending unit 114, or more generally sending means, configured for performing a sending procedure 14 described with reference to FIG. 6.

Furthermore, the request distributor 2 includes a selecting unit 126, or more generally selecting means, configured for selecting as a destination for the further request one of the at least two server computers 4a, 4b, 4. The selecting unit 126, or the selecting means, uses, on the one hand, distribution information made available by one of the at least two server computers 4a, 4b, 4 to the request distributor 2 and, on the other hand, at least one attribute associated with the further request, i.e. an attribute retrievable from the further request by the request distributor 2.

FIG. 12 schematically represents a server computer 4a according to one embodiment of the invention.

The server computer 4a comprises a server computer receiving unit 116, or more generally server computer receiving means, configured for performing the server computer receiving procedure 16 described with reference to FIG. 6.

In one embodiment, the server computer 4a also comprises a determining unit 118 (dotted line), or more generally determining means, configured for performing, by the server computer 4a, the determining procedure 18 described with reference to FIG. 6, and a providing unit 120 (dotted line), or more generally providing means, configured for performing, by the server computer 4a, the providing procedure 20 described with reference to FIG. 6.

In one embodiment, these two units, i.e. the determining unit 118 and the providing unit 120, are not included in a server computer 4a, but are arranged elsewhere.

Figures 13A, 13B:
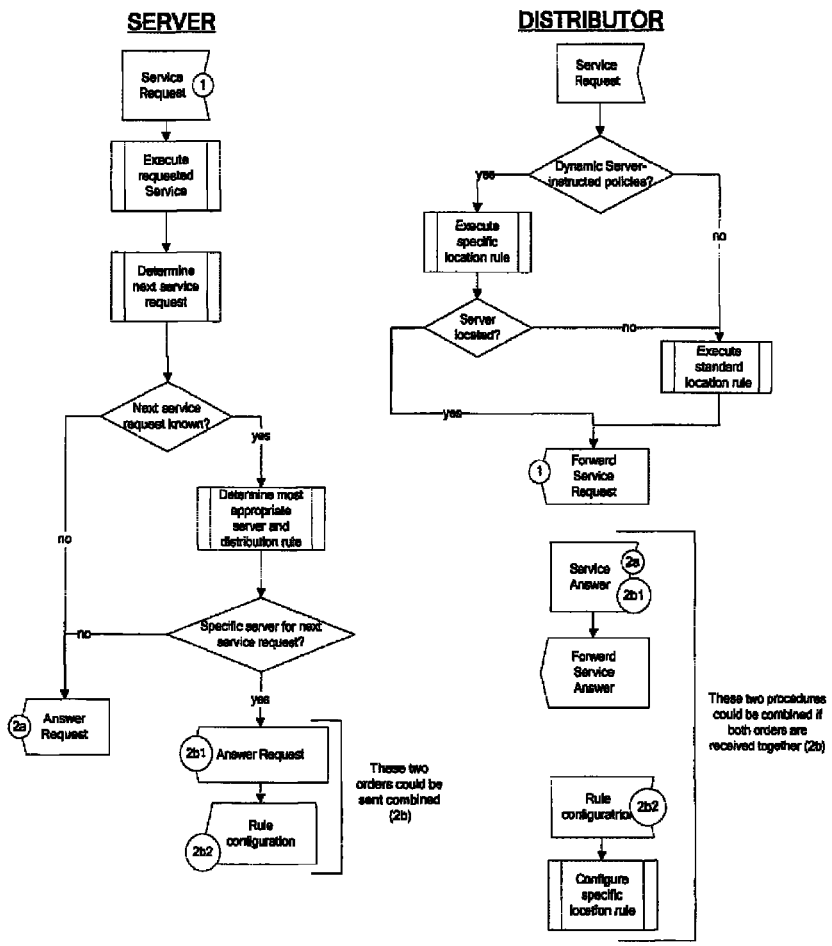
FIGS. 13a and 13b are flow charts respectively for a server computer and a request distributor according to one embodiment of the invention.

FIGS. 13a and 13b are flow charts respectively illustrating the operations of a server computer 4a, 4b, 4a and a request distributor 2 according to one embodiment of the invention.

In this embodiment and with reference to FIG. 13a, the server or server computer 4a, 4b, 4 receives (reference 1 in FIG. 13a) a service request, i.e. a request for a delivery of a service, executes, i.e. handles, said request, and determines, for instance according to a service execution flow, if there is a known next expected service request, i.e. a further request relating to the delivery of the service.

If a next service request or further request exists and is expected, the server computer 4a, 4b, 4 determines if there is a most appropriate server computer 4a, 4b, 4 for handling the next service request or further request, and if there is a most appropriate distribution rule for handling this next service request or further request. If there is a most appropriate server computer 4a, 4b, 4 and/or a most appropriate distribution rule, the server computer 4a, 4b, 4 responds (reference 2b1 in FIG. 13a) to the request and makes available (reference 2b2 in FIG. 13a) distribution information to the request distributor 2. The steps of responding (2b1) to the request and making available (2b2) distribution information to the request distributor 2 may be combined.

If no next service request or further request exists and is expected or if there is no most appropriate server computer 4a, 4b, 4 and no most appropriate distribution rule, the server computer 4a, 4b, 4 responds (reference 2a in FIG. 13a)

Still in this embodiment and with reference to FIG. 13b, top flow chart, the request distributor 2 receives a service request from the network 6. The request distributor 2 then determines whether dynamic server-instructed policies exist in relation to this service request. In other words, the request distributor 2 determines whether distribution information is available for handling the received request.

If yes, i.e. if distribution information is available for handling the received request, the specific location rule or distribution policy is executed to select the destination server computer 4a, 4b, 4. If the selected destination server computer 4a, 4b, 4 cannot be located, a standard distribution rule is executed and applied to select another server computer 4a, 4b, 4 and the request is forwarded (reference 1 in FIG. 13b) to the selected another destination server computer 4a, 4b, 4. Otherwise, if the selected destination server computer 4a, 4b, 4 can be found, the request is forwarded (reference 1 in FIG. 13b) to said selected destination server computer 4a, 4b, 4.

If no, i.e. if distribution information is not available for handling the received request, a standard distribution rule is executed and applied to select a destination server computer 4a, 4b, 4 and the request is forwarded (reference 1 in FIG. 13b) to the selected destination server computer 4a, 4b, 4.

Still in this embodiment and with reference to FIG. 13b, centre flow chart, if a service answer or response to a request is received (reference 2a and 2b1 in FIG. 13b) by the request distributor 2 from a server computer 4a, 4b, 4, then a service answer or response to a request is forwarded by the request distributor 2 to the client terminal 30.

With reference to FIG. 13b, bottom flow chart, if a rule configuration or distribution information is received (reference 2b2 in FIG. 13b) by the request distributor 2, the rule configuration or distribution information is stored so as to be subsequently used for distributing further received requests.

The step of receiving 2a, 2b1 a service answer or response to a request and the step of receiving 2b2 a rule configuration or distribution information may be carried out in combination.

In one embodiment, a method of the invention is applied in a wireless local area network (WLAN) configuration implementing an authentication system based on EAP-SIM or EAP-AKA over RADIUS.

EAP stands for Extensible Authentication Protocol. It is an authentication framework used in wireless networks and point-to-point connections. It is defined by RFC 3748 (Ababa, E., Blunk, L., Vollbrechtand, J., Carlson, J., and H. Levkowetz, Ed. "Extensible Authentication Protocol (EAP)", IETF RFC 3748, June 2004).

EAP-SIM stands for EAP for GSM Subscriber Identity and is used for authentication and session key distribution using the Global System for Mobile Communications (GSM) Subscriber Identity Module (SIM). EAP-SIM is defined in RFC 4186 (H. Haverinen, and J. Salowey, "Extensible Authentication Protocol Method for Global System for Mobile Communications (GSM) Subscriber Identity Modules (EAP-SIM)", IETF RFC 4186, January 2006).

EAP-AKA stands for EAP for UMTS Authentication and Key Agreement and is used for authentication and session key distribution using the Universal Mobile Telecommunications System (UMTS) UMTS Subscriber Identity Module (USIM). EAP AKA is defined in RFC 4187 (J. Arkko, H. Haverinen, "Extensible Authentication Protocol Method for 3rd Generation Authentication and Key Agreement (EAP-AKA)", IETF RFC 4187, January 2006).

EAP-SIM and EAP-AKA are authentication mechanisms complying with the EAP framework.

Remote Authentication Dial In User Service (RADIUS) is a security authentication and authorization protocol enabling a network access server to authenticate its links. RADIUS is defined in RFC 2865 (C. Rigney, S. Willens, A. Rubens, W. Simpson, "Remote Authentication Dial In User Service (RADIUS)", IETF RFC 2865, June 2000).

In this embodiment, client terminals 30 exchange requests and responses with an authentication server through a subscription locator function (SLF). The authentication server is a type of server computer 4a, 4b, 4 according to the invention. The subscription locator function (SLF) is a type of request distributor 2 according to the invention.

There are several authentication servers, each one being a server computer 4a, 4b, 4.

The exchanges of requests and responses between client terminals 30 and authentication servers are encapsulated into the RADIUS protocol for their transport through the network 6 and from the subscription locator function (SLF) (request distributor 2) and the authentication server (server computer 4a, 4b, 4). Since the exchange is encapsulated into RADIUS, the subscription locator function (SLF) cannot retrieve the user identity.

Even though in principle the subscription locator function (SLF) could be modified and could become highly specialized to be able to obtain EAP level information, this is not the case for existing subscription locator functions (SLF). In addition, even if the subscription locator function (SLF) could obtain a user identity, the identity could be a temporary one, unknown to the subscription locator function (SLF), due to the identity privacy support in EAP-SIM/AKA. Finally, even if identity privacy was not used, or if the subscription locator function (SLF) had means to obtain the user permanent identity from the temporary ones, not all EAP-SIM/AKA exchanges carry the user identity, and therefore the subscription locator function (SLF) would need additional means to track exchanges belonging to a given authentication procedure.

In this embodiment, an authentication procedure comprises several authentication requests initiated by the wireless local area network (KLAN) client terminals 30 that are trying to get access to the wireless local area network (WLAN), and the corresponding responses are sent by the authentication server (server computer 4a, 4b, 4).

EAP-SIM/AKA exchanges are processed end-to-end in the wireless local area network (WLAN) client and the authentication server 4a, 4b, 4. Between the wireless local area network (WLAN) access point 28 and the authentication server 4a, 4b, 4, EAP-SIM/AKA exchanges are encapsulated in RADIUS for their transport through the network, with the wireless local area network (WLAN) access point 28 acting as RADIUS client and the authentication server 4a, 4b, 4 acting as RADIUS server.

The request distributor 2 is not able to recognize the authentication request as a response to a challenge. Having that ability in the request distributor 2 would require interpreting the message contents up to EAP level, which is not possible for known traffic distributors.

Even if a request distributor 2 was able to recognize the authentication request as a response to a challenge, the request distributor 2 would have no information for selecting the authentication servers 4a, 4b, 4 with the ability to handle authentication vectors (AVs) and with the ability to check the response (i.e. the one that generated the challenge).

In order to solve this problem in this embodiment, all the authentication requests corresponding to a given authentication procedure are sent to the same authentication server 4a, 4b, 4 which locally keeps the necessary context information.

In more details, the request distributor 2 receives the first authentication request for an authentication procedure, transported in a RADIUS Access-Request message. Since the request distributor 2 has not received any specific indication from a server computer 4a, 4b, 4 applicable to that authentication request, the request distributor 2 applies a generic rule for the selection of a destination server computer 4a, 4b, 4 (e.g. applying round robin distribution), and it forwards the request to that server computer 4a, 4b, 4.

The selected server computer 4a, 4b, 4 receives the request and processes it. As a result of the processing, the server computer 4a, 4b, 4 may determine that further information (e.g. a suitable user identity) is required from the client terminal 30 (e.g. a user equipment or UE), or the server computer 4a, 4b, 4 may directly send an authentication challenge to the client terminal 30. In both cases, the server computer 4a, 4b, 4 sends an EAP-Request to the client terminal 30, encapsulated in a RADIUS Access-Challenge. Since the server computer 4a, 4b, 4 has context information to process subsequent messages from the client terminal 30 related to the authentication procedure, the server computer 4a, 4b, 4 may select itself as the most suitable server computer 4a, 4b, 4 to handle the subsequent messages.

In order to indicate this to the request distributor 2, the server computer 4a, 4b, 4 generates a value, for instance unique, and includes it in the RADIUS state attribute within the RADIUS Access-Challenge sent back to the request distributor 2. A standard attribute is therefore re-used with its standard information in such a manner that the request distributor 2 may interpret the content in a specific manner.

The request distributor 2 receives the RADIUS Access-Challenge, and as part of its rule configuration procedure, it checks that the RADIUS state attribute has been included.

The distribution information received via the RADIUS state attribute may for instance constitute parameters pertaining to routing policies configured in the request distributor 2. In this case, the configured routing policies may require that subsequent requests containing the same value in the RADIUS state attribute are directed to the server computer 4a, 4b, 4 from which that value was initially received.

Therefore, a rule is setup in the request distributor 2 so that subsequent requests containing a RADIUS state attribute with the same value as received from the server computer 4a, 4b, 4 are directed to the server computer 4a, 4b, 4.

The RADIUS Access-Challenge is sent back towards the WLAN access point 28, which in turn passes the encapsulated EAP-Request to the client terminal 30.

Upon receiving a response from the client terminal 30, the WLAN access point 28 encapsulates the response in a new RADIUS Access-Request, which is sent to the request distributor 2. According to the RADIUS protocol specification, the WLAN access point 28 includes the RADIUS state attribute in the RADIUS Access-Request message, with the same value as received in the previous RADIUS Access-Challenge.

When the request distributor 2 receives the RADIUS Access-Request, it determines that the RADIUS state attribute is present and that there is a server-instructed rule providing that any received requests containing that value in the RADIUS state attribute is to be sent to a given server computer 4a, 4b, 4. The request distributor 2 then forwards the RADIUS Access-Request to that given server computer 4a, 4b, 4.

The server computer 4a, 4b, 4 then receives the new RADIUS Access-Request and processes it.

If more roundtrips are needed, a new RADIUS Access-Challenge is sent to the request distributor 2, containing the same RADIUS state attribute. This time, the request distributor 2 need not setting up a new rule, since it has been already created, so that subsequent RADIUS Access-Requests are sent to the same server computer 4a, 4b, 4.

Eventually, the server computer 4a, 4b, 4 determines that the user is authenticated, and a RADIUS Access-Accept is sent back to the request distributor 2, containing the same RADIUS state attribute. The RADIUS Access-Accept is finally sent back to the WLAN access point 28, which then grants WLAN access to the client terminal 30.

In addition to what precedes, authentication server computers 4a, 4b, 4 may be specialized for handling authentication vectors. In this case, in one embodiment of a method according the invention, when the authentication procedure reaches the point that a challenge for authentication is sent to the client terminal 30, which requires handling of authentication vectors, the method could be as follows.

When the initially assigned server computers 4a, 4b, 4 determines that a challenge has to be sent to the client terminal 30, it passes the necessary context information to one specialized authentication server computers 4a, 4b, 4. The authentication server computers 4a, 4b, 4 then produces the challenge and sends it back to the request distributor 2, encapsulated in a RADIUS Access-Challenge that contains the same RADIUS state attribute as in previous roundtrips.

The request distributor 2 receives the RADIUS Access-Challenge, and, as part of its rule configuration procedure, it determines that a RADIUS state attribute has been included, and that the RADIUS state attribute matches one of the existing server-instructed rules. Since the server computer 4a, 4b, 4 has changed, the request distributor 2 updates the existing rule so that subsequent requests containing that value in the RADIUS state attribute are directed to the new, specialized server computer 4a, 4b, 4. The subsequent processing is then the same as described above.

In a further embodiment, when receiving the RADIUS Access-Accept, the request distributor 2 determines that the server-instructed rule associated to that RADIUS state attribute is no longer valid and that a rule clear up is to be performed. The distribution information made available to the request distributor 2 may be capable of being cleared up.

The rule clear up may be carried out by using a proprietary RADIUS attribute included by the server computer 4a, 4b, 4 in the RADIUS Access-Accept, and by configuring the request distributor 2 so that it interprets this attribute as an indication that the previously instructed rule is no longer valid. The request distributor 2 may then remove the proprietary attribute from the RADIUS Access-Accept before forwarding it to the WLAN access point 28.

The rule clear up may be also carried out by using a timeout mechanism in the request distributor 2 so that if a server-instructed rule or distribution information is not used for a period of time, then that rule or information is removed.

In a further embodiment, the providing procedure 20 is initiated by an operator command. The operator command may be a command to shutdown of one server computer 4a, 4b, 4, such as the server computer 4a, 4b, 4 to which a first request relating to the delivery of the process has been sent. This enables to quickly inform the request distributor 2 that a server computer 4a, 4b, 4 is not available anymore for handling requests.

Figure 14:
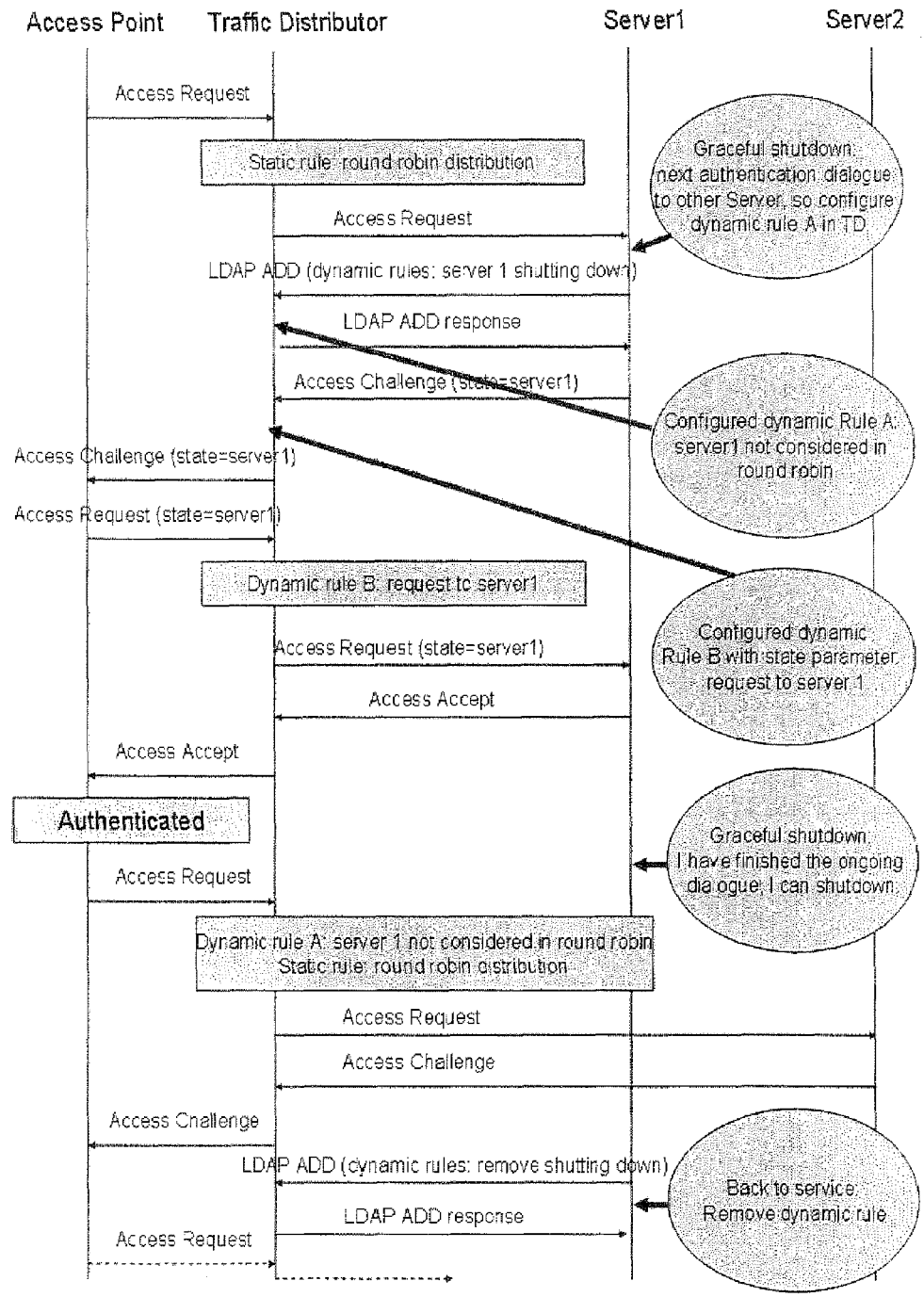
FIG. 14 illustrates a method for shutting down a server computer according to an embodiment of the invention.

In one embodiment of the invention, a shutdown of a server computer 4a, 4b, 4 may be performed in a graceful manner thanks to the method, system, request distributor 2 and server computer 4a, 4b, 4 according to the invention. This involves sending a notice to the request distributor 2, indicating to the request distributor 2 that a particular server computer 4a, 4b, 4 needs to be shutdown, for whatever reason, be it for maintenance or any other reason. This embodiment is illustrated in FIG. 14.

Due to network maintenance procedures (e.g. hardware or software updates), it is sometimes required to take one of the server computers 4a, 4b, 4 of a server cluster or pool out of service, so that the remaining servers 4a, 4b, 4 handle the traffic while the stopped server 4a, 4b, 4 is updated, until it is finally put back into service.

If the affected server 4a, 4b, 4 is directly put out of service, it implies that all ongoing transactions fail, thus causing a service disruption.

In order to alleviate this, a node-level procedure may be used so that, when graceful shutdown is initiated by an operation and maintenance command, the server computer 4a, 4b, 4 rejects all new requests, although it completes the ongoing ones (i.e. those that are being processed at that moment), and, when these are completed, the server computer 4a, 4b, 4 is shutdown.

This procedure has limitations. Some transactions are rejected as soon as a graceful shutdown procedure is initiated and until the node is effectively taken out of service so that no new transactions are directed to it during a period of time which may be long. In a wireless local area network (WLAN) context, a server computer 4a, 4b, 4 could complete a transaction that implies sending an authentication challenge to the client terminal 30, but, if the server computer 4a, 4b, 4 is then shutdown, it may not be possible anymore to determine the correctness of the response subsequently sent by the client terminal 30, and the authentication may fail.

In order to avoid service disruption associated with a shutdown, a method according to one embodiment of the invention is as follows.

When shutdown is initiated by an operation and maintenance command, the server computer 4a, 4b, 4 determines that it is not an appropriate server computer 4a, 4b, 4 for subsequent initial service requests. In order to indicate this to the request distributor 2, the server computer 4a, 4b, 4 may send an instruction to the request distributor 2, e.g. using the Lightweight Directory Access Protocol (LDAP). In order words, the server computer 4a, 4b, 4 may make distribution information available to the request distributor 2 with the specific aim to instruct it 2 to stop sending requests to said server computer 4a, 4b, 4.

When receiving the sent instruction, the request distributor 2 sets up a rule so that initial service requests are no longer sent to the affected server computer 4a, 4b, 4.

In the above-described wireless local area network (WLAN) context, with this new rule a RADIUS Access- Request would only be sent to the affected server computer 4a, 4b, 4 if the message contains a RADIUS state attribute for which there exists a server-instructed rule (previously set up by the affected server computer 4a, 4b, 4) directing the RADIUS Access-Request to that server.

As a result, service requests associated to service executions that were initiated before the graceful shutdown command are still directed to the affected server computer 4a, 4b, 4 if needed, so that those service executions can be completed.

Then, when the server computer 4a, 4b, 4 has completed all pending service executions, it shutdowns.

When the server computer 4a, 4b, 4 is put back into service, this is indicated to the request distributor 2, e.g. using the Lightweight Directory Access Protocol (LDAP).

When receiving this indication, the request distributor 2 removes the previously created rule, so that initial service requests can now be sent to the affected server computer 4a, 4b, 4.

FIG. 14 shows a corresponding RADIUS flow, illustrating the configuration and operation of the request distributor 2 in this embodiment of the invention, the configuration of the server computers 4a, 4b, 4, the dynamic rules and rules execution in the request distributor 2 (in FIG. 14, TD stands for traffic distributor). Dynamic rules are configured in two ways, through an LDAP ADD command to the request distributor 2 or through the state parameter included in the RADIUS operation.

In FIG. 14, only the RADIUS operations are shown for clarity. Inside every RADIUS operation an EAP information unit is included with the needed data to execute the EAP service, in this case, and the SAP AKA authentication service.

A typical EAP-AKA authentication scenario is as follows. First, an access point 28 sends a RADIUS Access Request including an RAP-response-identity information unit received from the EAP client. The EAP server 4a, 4b, 4 sends back a RADIUS Access Challenge including an EAP-request-AKA-challenge. The access point 28 sends back the EAP-request to the EAP client. The access point 28 sends a RADIUS Access Request including an EAP-response-AKA-challenge received from the EAP client. Finally the EAP server 4a, 4b, 4 sends back a RADIUS Access Accept including an EAP-success that the access point 28 sends back to the EAP client.

The physical entities of the system according to the invention, including the request distributor 2 and the server computer 4a, 4b, 4 may comprise or store computer programs including instructions such that, when the computer programs are executed on the physical entities, steps and procedures according to one embodiment of the invention are carried out. The invention also relates to such computer programs for carrying out methods according to the invention, and to any computer-readable medium storing the computer programs for carrying out methods according to the invention.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method for distributing requests received by a request distributor to at least two server computers, wherein the request distributor is configured to use distribution information for selecting, as a destination for each of at least some of the requests, one of the at least two server computers, depending on at least one attribute associated with said each request, the method including:
    a request distributor receiving procedure for receiving, by the request distributor, a first request from a client terminal, wherein the first request relates to a delivery of a service to the client terminal;
    a sending procedure for sending, by the request distributor, the first request to one of the at least two server computers;
    a server computer receiving procedure for receiving, by the server computer to which the first request is sent, the first request sent by the request distributor;
    a determining procedure for determining, by the server computer to which the first request is sent, whether a further request relating to the delivery of the service is expected to be received by the request distributor; and
    a providing procedure for making available, by the server computer to which the first request is sent, distribution information to the request distributor prior to an expected receipt of the further request at the request distributor if, in the determining procedure, the further request relating to the delivery of the service is determined to be expected to be received by the request distributor.

2. The method of claim 1, wherein the request distributor is a network node.

3. The method of claim 1, wherein the request distributor includes a plurality of network nodes.

4. The method according to claim 1, wherein the determining procedure further includes determining that a response to the first request is to be sent by the one of at least two server computers and that the further request relating to said service is expected to be received by the request distributor after the response is sent.

5. The method according to claim 1, wherein the distribution information identifies that the preferred or assigned destination for the further request is one of the at least two server computers.

6. The method according to claim 1, wherein the determining procedure is performed by the one of the at least two server computers.

7. The method according to claim 1, wherein the determining procedure is based on at least one of: the first request, the service, the type of service, the characteristics of the service, and the reached stage in the delivery of the service.

8. The method according to claim 1, wherein the providing procedure is performed by the one of the at least two server computers.

9. The method according to claim 1, wherein the providing procedure includes providing the distribution information to the request distributor.

10. The method according to claim 1, wherein the providing procedure includes storing the distribution information in a storing means accessible by the request distributor.

11. The method of claim 10, wherein the storing means is a Lightweight Directory Access Protocol compliant directory.

12. The method according to claim 1, wherein the providing procedure is initiated by an operator command.

13. The method of claim 12, wherein the operator command is a command to shutdown the one of the at least two server computers.

14. A method, carried out by a server computer, of making distribution information available to a request distributor, wherein the request distributor is configured to receive requests from a client terminal relating to a delivery of a service to the client terminal, to distribute each one of the requests to the server computer and at least one other server computer, and to use the distribution Information for selecting, as a destination for each of at least some of the requests, one of the server computer and the at least one other server computer depending on at least one attribute associated with said each request, the method including:
- a determining procedure for determining, by the server computer whether a further request relating to the delivery of the service to the client terminal is expected to be received by the request distributor; and
- a providing procedure for making available, by the server computer, the distribution information to the request distributor prior to an expected receipt of the further request at the request distributor if, in the determining procedure. the further request relating to the delivery of the service is determined to be expected to be received by the request distributor.

15. The method of claim 14, wherein the determining procedure further includes determining, by the server computer, that a response to a first request is to be sent by the server computer and that the further request relating to said service is expected to be received by the request distributor after the response is sent.

16. The method according to claim 14, wherein the distribution information identifies that the preferred or assigned destination for the further request is one of the server computer and the at least one other server computer.

17. The method according to claim 14, wherein the determining procedure is based on at least one of: a first request, the service, the type of service, the characteristics of the service, and the reached stage in the delivery of the service.

18. The method according to claim 14, wherein the providing procedure includes providing the distribution information to the request distributor.

19. The method according to claim 14, wherein the providing procedure includes storing the distribution information in a storing means accessible by the request distributor.

20. The method of claim 19, wherein the storing means is a Lightweight Directory Access Protocol compliant directory.

21. The method according to claim 14, wherein the providing procedure is initiated by an operator command.

22. The method of claim 21, wherein the operator command is a command to shutdown the server computer.

23. A method, carried out by a request distributor, of distributing requests to at least two server computers, wherein the request distributor is configured to receive requests from a client terminal and to distribute each one of the requests to one of at least two server computers, and at least the one of the at least two server computers is configured to make available distribution information to the request distributor, the method including:
- a receiving procedure for receiving, by the request distributor, a first request from the client terminal, wherein the first request relates to a delivery of a service to the client terminal;
- a sending procedure for sending, by the request distributor, the first request to one of the at least two server computers;
- the receiving procedure further including receiving, by the request distributor, a further request relating to the delivery of the service;
- a selecting procedure for selecting, by the request distributor, as a destination for the further request, one of the at least two server computers, by using distribution information made available to the request distributor by the server computer to which the first request is sent and depending on at least one attribute associated with the further request;
- the distribution information being made available prior to receipt of the further request by the request distributor: and
- the sending procedure further including sending, by the request distributor, the further request to the server computer selected in the selecting procedure.

24. The method of claim 23, wherein the distribution information identifies that the preferred or assigned destination for the further request is one of the at least two server computers.

25. The method of claim 23, wherein, in the selecting procedure, using distribution information made available by the server computer to which the first request is sent includes using distribution information provided by the server computer to which the first request is sent.

26. The method according to claim 23, wherein, in the selecting procedure, using distribution information made available by the server computer to which the first request is sent includes using distribution information stored in a storing means accessible by the request distributor.

27. A system including a request distributor and at least two server computers, the system being configured for distributing requests received by the request distributor to the at least two server computers, wherein the request distributor is configured to use distribution information for selecting, as a destination for each of at least some of the requests, one of the at least two server computers, depending on at least one attribute associated with each of said requests, the system further including:
- a request distributor receiving device configured for receiving, by the request distributor, a first request from a client terminal, wherein the first request relates to a delivery of a service to the client terminal;
- a sending device configured for sending, by the request distributor, the first request to one of the at least two server computers;
- a server computer receiving device configured for receiving, by the server computer to which the first request is sent, the first request sent by the request distributor;
- a determining device configured for determining, by the server computer to which the first request is sent, whether a further request relating to the delivery of the service is expected to be received by the request distributor; and
- a providing device configured for making available, by the server computer to which the first request is sent, distribution information to the request distributor prior to an expected receipt of the further request at the request distributor receiving device if, in the determining device, a further request relating to the delivery of the service is determined to be expected to be received by the request distributor.

28. The system of claim 27, wherein the determining device is further configured for determining that a response to the first request is to be sent by the server computer to which the first request is sent and that the further request relating to said service is expected to be received by the request distributor after the response is sent.

29. The system of claim 27, wherein the distribution information identifies that the preferred or assigned destination for the further request is one of the at least two server computers.

30. The system according to claim 27, wherein the determining device is included in the one of the at least two server computers.

31. The system according to claim 27, wherein the providing device is comprised in one of the at least two server computers.

32. The system according to claim 27, wherein the providing device is further configured to provide the distribution information to the request distributor.

33. The system according to claim 27, wherein the providing device is further configured to store the distribution information in a storing device accessible by the request distributor.

34. The system according to claim 27, wherein the providing device is further configured to be initiated by an operator command.

35. The system of claim 34, wherein the operator command is a command to shutdown the one of the at least two server computers.

36. A server computer configured for making distribution information available to a request distributor, wherein the request distributor is configured to receive requests from a client terminal, to distribute each one of the requests to the server computer and at least one other server computer, and to use the distribution information for selecting, as a destination for each of at least some of the requests, one of the server computer and the at least one other server computer, depending on at least one attribute associated with said each request, the server computer including:
a determining unit configured for determining whether a further request relating to the delivery of the service to the client terminal is expected to be received by the request distributor; and
a providing unit configured for making available the distribution information to the request distributor prior to an expected receipt of the further request at the request distributor if, in the determining unit, the further request relating to the delivery of the service is determined to be expected to be received by the request distributor.

37. The server computer of claim 36, wherein the determining unit is further configured for determining that a response to a first request is to be sent by the server computer and that the further request relating to said service is expected to be received by the request distributor after the response is sent.

38. The server computer of claim 36, wherein the distribution information identifies that the preferred or assigned destination for the further request is one of the server computer and the at least one other server computer.

39. The server computer according to claim 36, wherein in determining whether the further request is expected to be received by the request distributor, the determining unit uses at least one of; a first request, the service, the type of service, the characteristics of the service, and the reached stage in the delivery of the service.

40. The server computer according to claim 36, wherein the providing unit is further configured for providing the distribution information to the request distributor.

41. The server computer according to claim 36, wherein the providing unit is further configured for storing the distribution information in a storing unit accessible by the request distributor.

42. The server computer according to claim 36, wherein the providing unit is further configured to be initiated by an operator command.

43. The server computer of claim 42, wherein the operator command is a command to shutdown the server computer.

44. A request distributor configured for distributing requests to at least two server computers, wherein the request distributor is configured to receive requests from a client terminal and to distribute each one of the requests to one of at least two server computers, and at least one of the at least two server computers is configured to make available distribution information to the request distributor, the request distributor including:
a receiving device configured for receiving a first request from the network, wherein the first request relates to a delivery of a service to the client terminal;
a sending device configured for sending the first request to one of the at least two server computers;
the receiving device being further configured for receiving a further request relating to the delivery of the service; and
a selecting device configured for selecting as a destination for the further request, one of the at least two server computers, by using distribution information made available to the request distributor by the server computer to which the first request is sent and depending on at least one attribute associated with the further request, the distribution information being made available prior to receipt of the further request by the request distributor, and
the sending device being further configured for sending, by the request distributor, the further request to the server computer selected by the selecting device.

45. The request distributor of claim 44, wherein the distribution information identifies that the preferred or assigned destination for the further request is one of the at least two server computers.

* * * * *

UNITED STATES PATENT AND TRADEMARK OFFICE
CERTIFICATE OF CORRECTION

| | | |
|---|---|---|
| PATENT NO. | : 8,639,741 B2 | |
| APPLICATION NO. | : 12/676457 | |
| DATED | : January 28, 2014 | |
| INVENTOR(S) | : Gonzalez Plaza et al. | |

It is certified that error appears in the above-identified patent and that said Letters Patent is hereby corrected as shown below:

In the Drawings:

In Fig. 14, Sheet 11 of 11, delete " 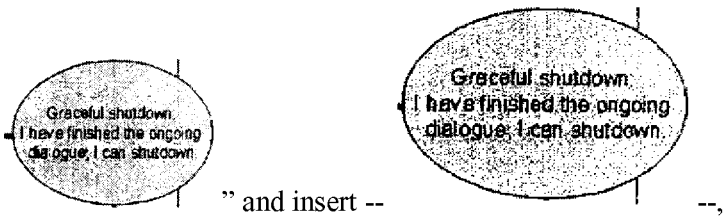 " and insert -- -- --, therefor.

In the Specification:

In Column 5, Line 30, delete "handling" and insert -- handling a --, therefor.

In Column 7, Lines 40-47, delete "the service, whether........distributor." and insert the same at Line 39, after "service, and" as a continuation of paragraph.

In Columns 7 & 8, Lines 53-67 & 1-3, delete "at least............selecting unit." and insert the same at Line 52 after "computers, and" as a continuation of paragraph.

In Column 10, Line 55, delete "providing procedure 10" and insert -- providing procedure 20 --, therefor.

In Column 12, Line 29, delete "request distributor 30," and insert -- request distributor 2, --, therefor.

In Column 13, Line 61, delete "4a and" and insert -- 4 and --, therefor.

In Column 14, Line 19, delete "FIG. 13a)" and insert -- FIG. 13a). --, therefor.

Signed and Sealed this
Fifth Day of August, 2014

Michelle K. Lee
*Deputy Director of the United States Patent and Trademark Office*

In Column 14, Line 65, delete "(Ababa, E.," and insert -- (Aboba, B., --, therefor.

In Column 14, Line 65, delete "Vollbrechtand, J.," and insert -- Vollbrecht, J., --, therefor.

In Column 15, Lines 57-58, delete "wireless local area network (KLAN)" and insert -- wireless local area network (WLAN) --, therefor.

In Column 19, Line 32, delete "SAP AKA" and insert -- EAP AKA --, therefor.

In Column 19, Line 35, delete "RAP-" and insert -- EAP- --, therefor.

In the Claims:

In Column 21, Line 3, in Claim 14, delete "Information" and insert -- information --, therefor.

In Column 21, Line 16, in Claim 14, delete "procedure." and insert -- procedure, --, therefor.

In Column 22, Line 5, in Claim 23, delete "distributor:" and insert -- distributor; --, therefor.

In Column 24, Line 1, in Claim 39, delete "of;" and insert -- of: --, therefor.